(12) United States Patent
Farrell et al.

(10) Patent No.: US 6,459,489 B1
(45) Date of Patent: Oct. 1, 2002

(54) ALIGNMENT OF MAGNETIC HEADS FOR AUTOMATIC IDENTIFICATION OF REGIONS OF INTEREST FOR INTERFEROMETRIC MEASUREMENT

(75) Inventors: Colin T. Farrell, Sahuarita; Mark A. Schmucker, Tucson, both of AZ (US)

(73) Assignee: Veeco Instruments, Inc., Tucson, AZ (US)

( * ) Notice: Subject to any disclaimer, the term of this patent is extended or adjusted under 35 U.S.C. 154(b) by 189 days.

(21) Appl. No.: 09/585,370

(22) Filed: Jun. 1, 2000

(51) Int. Cl.$^7$ ................................................ G01B 11/02
(52) U.S. Cl. ........................................ 356/508; 356/512
(58) Field of Search ................................ 356/508, 510, 356/497, 511, 512

(56) References Cited

U.S. PATENT DOCUMENTS 5,680,231 A * 10/1997 Hunsaker et al. ........... 356/507

* cited by examiner

Primary Examiner—Samuel A. Turner
Assistant Examiner—Patrick Connolly
(74) Attorney, Agent, or Firm—Antonio R. Durando; Durando Birdwell & Janke P.L.C.

(57) ABSTRACT

An electronic template representing the topography of a magnetic head being tested and delineating distinct patterns corresponding to particular regions of interest, such as ABS surfaces, is provided in order to limit analysis of the sample's surface to such regions. The outline of the slider positioned within the field of view of an interferometric microscope is identified by measuring the modulation of incident light at each pixel inside and outside the contour of the sample using the loci of perceivable fringe contrast as the criterion for establishing the location of such edges. Once the outline of the slider within the plastic tray is so established, the slider is shifted within the field of view to match the position of the template, thereby automatically achieving a precise alignment of the template with the boundary of the slider. In turn, the template patterns will also be aligned with the regions of interest in the magnetic head and interferometric analysis can be limited to data corresponding to the pixels contained within those patterns. Curve-fitting schemes can be used to facilitate and expedite the process of identifying the contour of the slider sample. In the case of conventional magnetic-head sliders, which are substantially rectangular in plan view, straight-line fitting between a few data points along two adjacent edges is sufficient to find the location of the edges and the corner between them, which in turn can be used is straightforward manner to align the template with the slider.

24 Claims, 11 Drawing Sheets

ALIGNMENT OF MAGNETIC HEADS FOR AUTOMATIC IDENTIFICATION OF REGIONS OF INTEREST FOR INTERFEROMETRIC MEASUREMENT

BACKGROUND OF THE INVENTION

1. Field of the Invention

This invention pertains to the general field of interferometry and apparatus for testing surfaces. In particular, it provides a novel approach for automatically identifying regions of interest of magnetic heads of computer disk drives, such as air-bearing surfaces, for interferometric-measurement analysis.

2. Description of the Prior Art

The magnetic-head slider of a magnetic disk system operates by floating in very close proximity over the surface of the magnetic disk, thereby accurately reading and writing data thereon. While the slider is floating disposed substantially in parallel over the disk during operation, it must be able to adjust its attitude to conform to magnetic-disk surface imperfections and dynamic displacements, such as surface vibrations generated by the rotating movement. Therefore, the flatness of the slider's surface facing the disk and the shape and torsional characteristics of the suspension supporting it are critical to the proper functioning of the apparatus and must be maintained within prescribed design specifications to prevent contact with the disk surface and avoid the disabling consequences that normally result from such events.

Accordingly, magnetic heads are tested for quality control by interferometric profiling techniques during manufacture. Since magnetic-head sliders consist of a multilayer structure, it is usually desirable to distinguish between its various layers for testing purposes. For example, magnetic heads include an outer air-bearing surface (first level ABS) designed to provide floating over the surface of the disk, a shallower intermediate region, and a deeper cavity region embedded within the slider. The geometry of all regions varies greatly with different manufacture designs in a continuous effort to improve the sliders' performance at ever increasing speeds and degrees of miniaturization. Typically, the exact geometry and manufacture tolerances of the ABS region are critical. Therefore, the automated interferometric equipment performing quality-control testing needs to be able to identify and measure the ABS region rapidly and effectively.

Typically, the ABS region of a magnetic head consists of multiple islands separated by intermediate and cavity regions. Prior-art identification techniques use a template approach, where a specific geometry representing the expected configuration of the region of interest is compared to the shape of measured islands of modulation or height data to identify the ABS regions of interest. The approach works very well when the slider being tested is adequately aligned with the template because a substantial overlap will necessarily occur. In practice, though, during the process of manufacture multiple sliders are placed in arrays in plastic trays that serve as the sample stage for interferometric measurement. Each magnetic head is loosely contained within a discrete compartment or well in the tray; therefore, the heads are often misaligned with respect to an optimal position represented by a desirable reference line aligned with the template within the field of view of the interferometric objective.

For example, FIG. 1 illustrates a magnetic head 10 wherein numerals 12,14,16 represent ABS regions according to a given magnetic-head design. Intermediate shallower regions 18,20,22 and a cavity 24 are also illustrated. Assume, for instance, that the head is positioned in the compartment or well 26 of a tray T at an angle a with respect to a reference baseline 28, as illustrated in FIG. 2 in exaggerated condition for the purpose of illustration (note that the baseline 28 is shown to correspond to the bottom edge of the compartment 26 for simplicity, but any other line could be used as well). Assume also that an electronic template 30 with patterns or islands 32,34,36 designed to match the ABS regions 12,14,16 for identification, as shown in FIG. 3, is aligned with the baseline 28 of the tray containing the magnetic head 10 within the field of view of the testing interferometer. It is understood that the initial placement of the template would normally be carried out over the slider's expected position within the well 26 under optimal circumstances, so as to automatically overlay the slider. As illustrated in FIG. 4, though, in the example at hand, where the slider is shifted with respect to its optimal position, a superimposition of the template over the expected position of the magnetic head would produce a mismatch that would greatly hinder the process of identification of the regions of interest using prior-art techniques. As shown, the pattern 32 in the template 30 would be completely off its intended target, region 12, and the patterns 34,36 would only partially overlay the regions 14,15.

To correct for this misalignment, prior-art template systems have used alignment procedures based on matching predetermined landmarks in the template with regions of data in the sample. For example, if two islands in the template (e.g., 34 and 36 in template 30) are designated for identification of corresponding uniform-height ABS regions in the sample (14 and 16 in slider 10), various regions of measured data in the magnetic head are tested for shapes that match the islands, such as by selecting areas of uniform data having a size and shape approximately equal to the template islands (such as the pixels corresponding to regions 14 and 16 in FIG. 2). When roughly matching regions are identified, a significant marker (such as the center of gravity) is calculated for each region and aligned with the corresponding marker in the template islands. As a result of the procedure, the magnetic head is deemed aligned with the template and the data overlapped by the template islands are used for the interferometric analysis of the regions of interest.

A significant problem with these prior-art procedures is the correct identification of the true regions of interest. If the magnetic head is sufficiently displaced from its ideal position in the tray (i.e., the position overlayed by the initial placement of the template), as illustrated in FIG. 4, the matching algorithm may not be able to identify any matching regions, thereby disrupting the automatic implementation of the test procedure.

Accordingly, it would be very desirable to have a simpler and more practical method and apparatus for identifying the regions of interest in a sample to be tested by interferometric means. This invention provides such a method and apparatus on the basis of a distinct and identifiable geometry of the tested magnetic-head slider.

BRIEF SUMMARY OF THE INVENTION

It is therefore an objective of this invention to provide an automatic procedure for identifying regions of interest in a test sample, so that interferometric testing can be limited to such regions to provide a faster and more efficient testing capability.

Another objective of the invention is a procedure for aligning a sample surface with a template without relying on the recognition of landmarks in the surface.

Another goal of the invention is a method and apparatus that do not require matching of data collected from the test surface with corresponding patterns in a selected template.

A further objective of the invention is that the testing procedure minimize manipulation of the test sample. Another goal of the invention is its general application to instrumentation that requires alignment of the sample to a predetermined template, or vice versa, for the purpose of selectively testing only portions of the sample's surface.

Finally, another goal is the implementation of the above mentioned objectives in a commercially viable system that maximizes the utilization of existing technology.

In accordance with these and other objectives, the preferred embodiment of the method of this invention consists of providing an electronic template representing the topography of the magnetic head being tested and delineating distinct patterns corresponding to particular regions of interest, such as ABS surfaces, so that analysis of the sample's surface can be limited to those regions. According to one aspect of the invention, the outline of the slider positioned within the field of view of an interferometric microscope is identified by measuring the modulation of incident light at each pixel inside and outside the contour of the sample using the loci of perceivable fringe contrast as the criterion for establishing the location of such edges. Once the outline of the slider within the plastic tray is so established, the position of the slider is shifted within the field of view coordinates to match the template, thereby automatically achieving a precise alignment of the template with the boundary of the slider. In turn, the template patterns will also become aligned with the regions of interest in the magnetic head and interferometric analysis can be limited to data corresponding to the pixels contained within those patterns.

As a result of the technique of the invention, the regions of interest in a magnetic head are quickly identified and tested, avoiding the unnecessary steps of analyzing the remaining regions of the sample. According to another aspect of the invention, curve-fitting schemes can be used to facilitate and expedite the process of identifying the contour of the slider sample. In the case of conventional magnetic-head sliders, which are substantially rectangular in plan view, straight-line fitting between a few data points along two adjacent edges is sufficient to find the location of the edges and the corner between them, which in turn can be used is straightforward manner to align the template with the slider. Obviously, the minimum such number of data points is four, two for each identified edge of the slider (three points suffice if the angle between the edges is known).

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

BRIEF DESCRIPTION OF THE DRAWINGS

FIG. 9 is an examplary table of modulation data collected with a PSI scan of the slider of FIG. 8 to find the outline of the slider according to the invention.

DETAILED DESCRIPTION OF THE INVENTION

Figure 1:
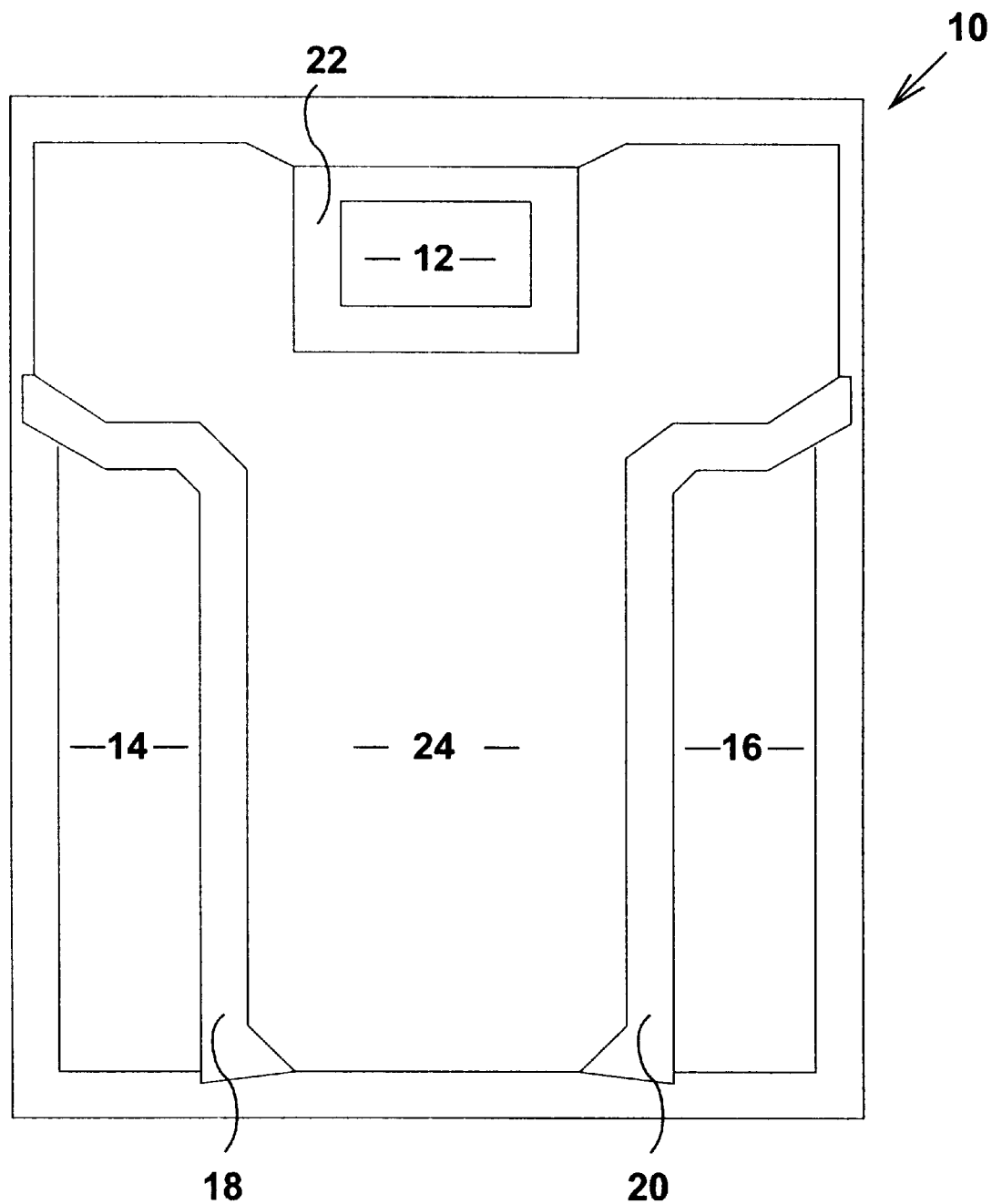
FIG. 1 is a schematic representation of a typical magnetic head.
Figure 2:
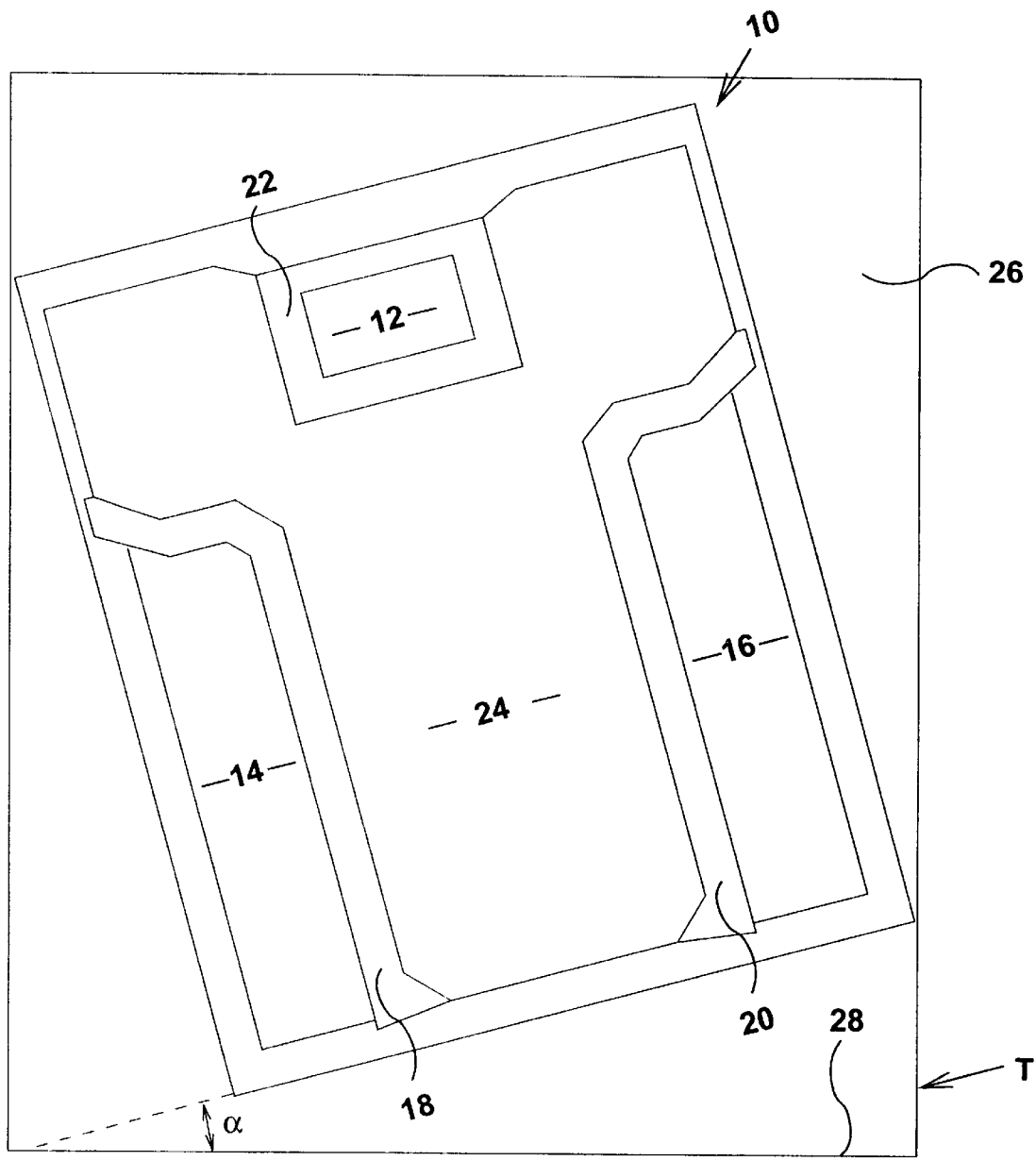
FIG. 2 is an illustration of the magnetic head of FIG. 1 placed in the well of a conventional tray used to hold arrays of magnetic-head sliders for quality-control testing purposes during manufacture.
Figure 3:
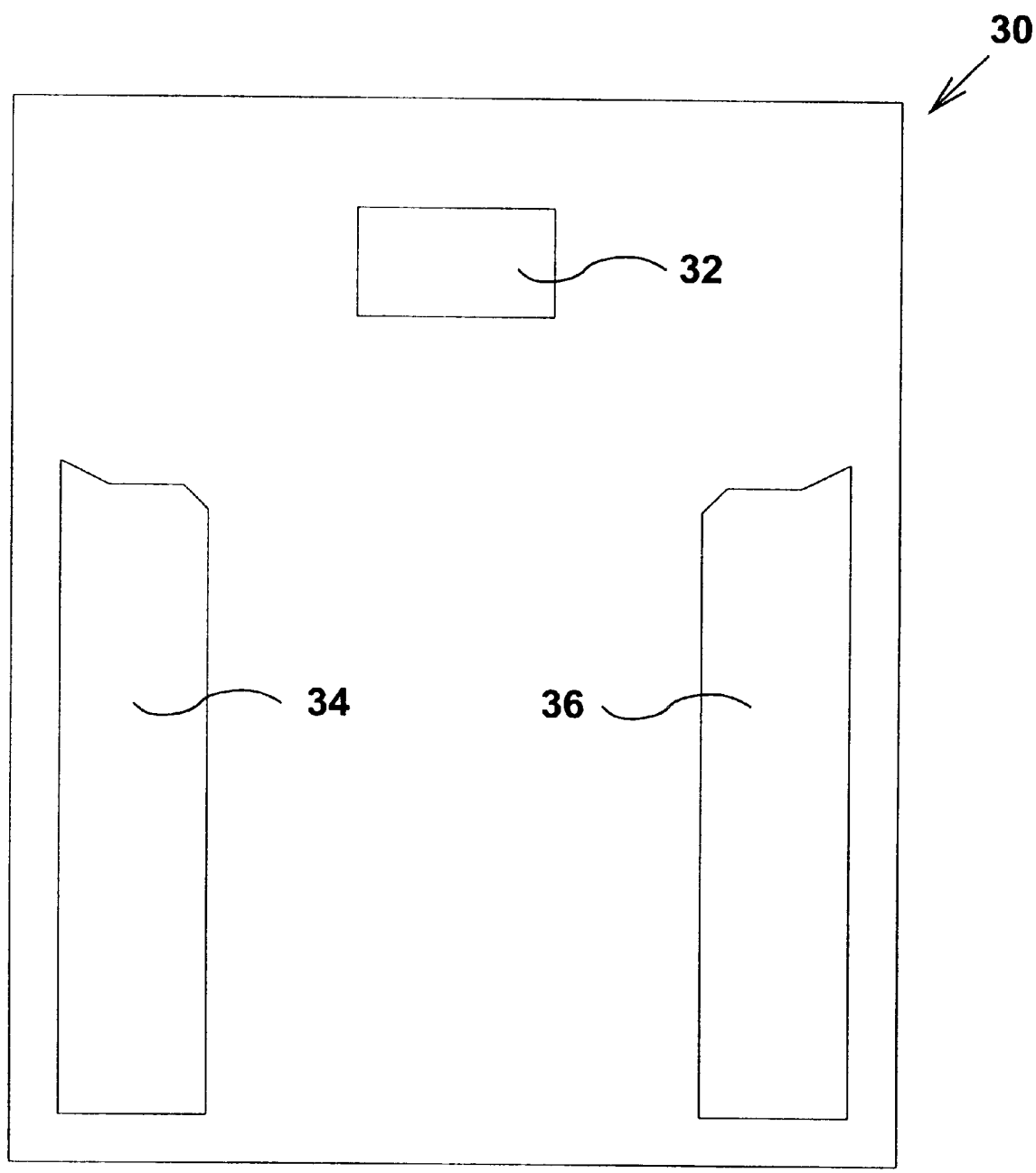
FIG. 3 is an illustration of a template designed to match certain distinct regions of interest, such as ABS regions, in the magnetic head of FIG. 1.
Figure 4:
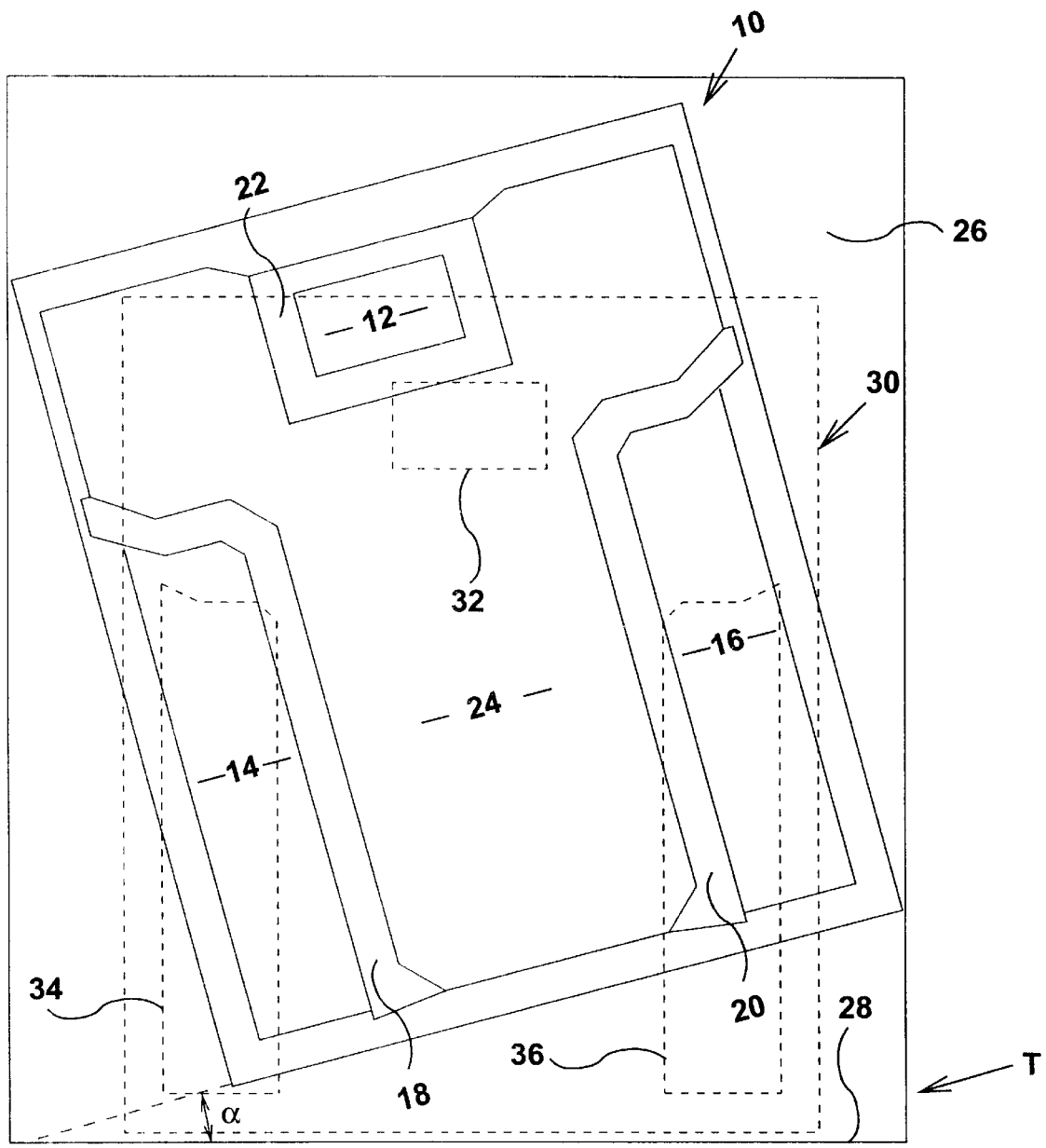
FIG. 4 shows the template of FIG. 3 partially superimposed on the magnetic head illustrated in FIG. 2.

The method and apparatus of this invention are based on the realization that the data gathered during a normal scan of a magnetic-head sample to perform vertical scanning interferometry (VSI) or phase shifting interferometry (PSI) provide sufficient information for aligning the sample with a corresponding template. So long as the tray has very low reflectivity or the focal depth of the interferometric microscope does not include the surface of the tray containing the sample during the data-gathering scan, no modulation is recorded for light incident on the tray during a normal scan of the sample surface. Therefore, the outline of the sample can be identified simply by searching for the locations in the field of view of the microscope where modulation first occurs moving inward from the boundary of the field of view.

The term slider is commonly used in the art to refer to the structure embodying the magnetic head of a computer disk drive. Magnetic head is commonly intended to refer to the portion of a slider containing the ABS and other regions constituting the read/write components of the slider. The two terms are also often used interchangeably in the art; therefore, for the purposes of this disclosure their use is intended to be equivalent unless clearly separated by the distinction made above.

It is known that interference fringes between reflections from a sample surface and a reference surface exposed to a light beam occur only within the coherence length of the light, which is a function of bandwidth. It is also known that fringes are detected by a microscope objective only when the sample surface is within the focal depth of the objective. A typical magnetic-head slider is about 300-$\mu$m thick, but the regions of interest (first level ABS, intermediate region, and deeper cavity region) are all contained within a depth of approximately 0.2 micron. The slider is contained in a well 26 that is typically about 600 μm deep in the tray T. The depths of focus of conventional interferometric microscopes used for VSI and PSI measurements range from about 0.01 μm to about 1 μm, respectively, and several frames of data (at least a dozen and five or more are usually considered optimal for VSI and PSI measurements, respectively) are normally taken while performing a scan within the focal depth without a need for refocusing the objective. Therefore, interference fringes are produced only by the light reflected from the regions of interest at the top of the slider, while the bottom surface of the wells 26 and the top surface of the tray T provide no measurable modulation.

Exploiting this practical condition of normal operation, the invention consists of taking a sufficient number of data frames for performing either VSI or PSI analysis while the microscope objective is scanned through focus over the regions of interest with a field of view containing the slider and at least a portion of the tray holding the slider. Based on the interferometric data so collected, the modulation is calculated at each pixel by conventional means using the well known equation:

$$I(z) = I_o + m(z)\cos(\omega_o z + \alpha),$$

where $I(z)$ is the light intensity at the detector, $I_o$ is the constant bias component of the signal (also known as the DC component), $m(z)$ is the modulation signal, $\omega_o$ is the incremental phase change or fringe signal, and $\alpha$ is the initial phase, which is assumed constant with respect to the vertical dimension $z$ (the scanning coordinate producing a variable optical path difference, OPD).

If VSI is being performed, a white or broad-bandwidth light is used, as well understood in the art. PSI techniques usually make use of a narrow-band light source and assume that $m(z)$ is constant throughout the measurement. In either case, the data gathered during the scan provide modulation information for each detector pixel receiving light intensity signals from the field of view of the microscope objective.

Figure 5:
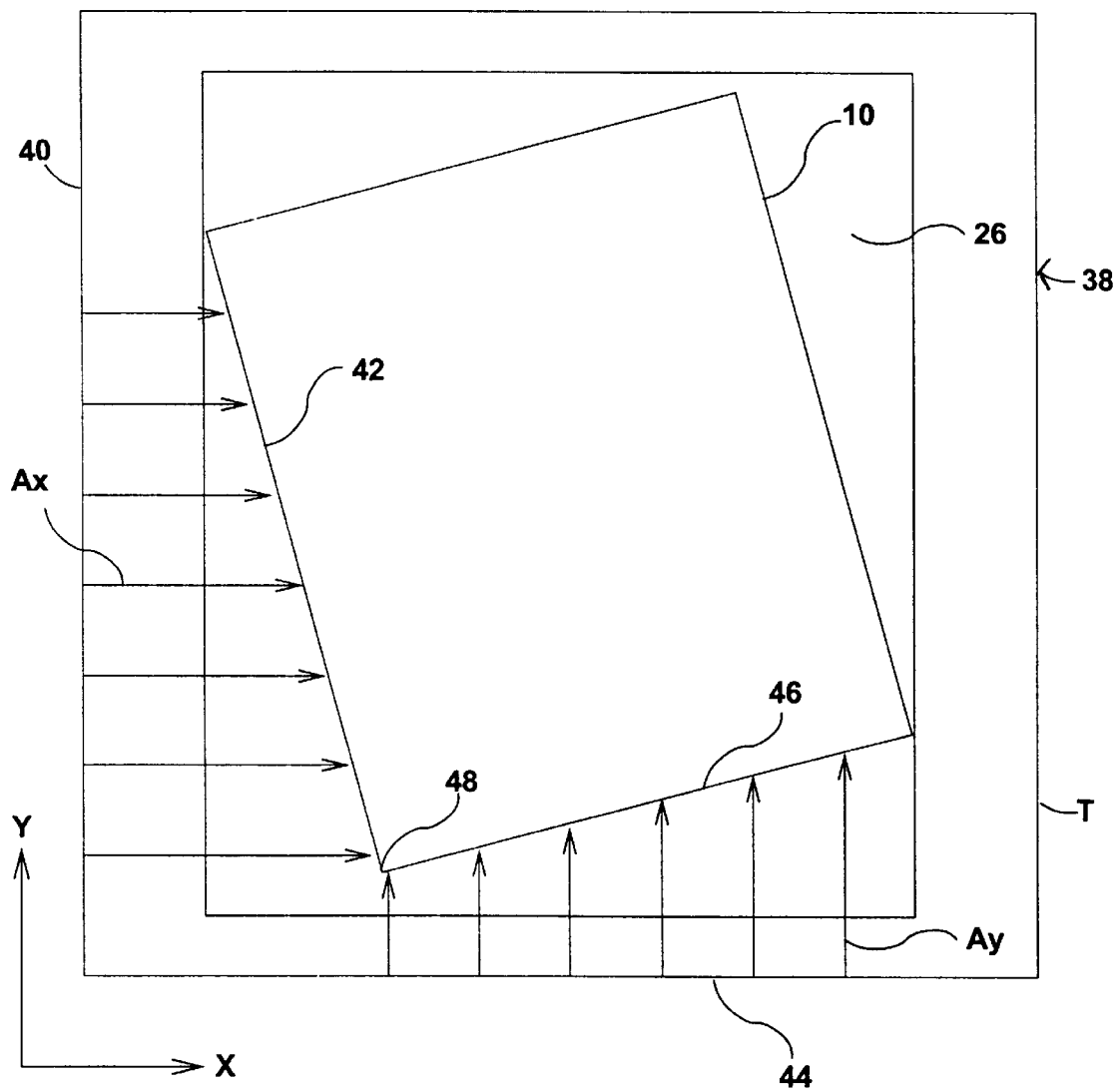
FIG. 5 is an illustration of a microscope objective's field of view including a tray and a tilted slider within a well in the tray. The figure also illustrates the approach of the invention for identifying the position of the left and bottom edges of the slider within the field of view.

The novel part of the procedure of the invention begins with the step of checking the value of the modulation calculated at each successive pixel in an arbitrary direction from a selected side of the field of view. For example, denoting as x and y the orthogonal directions in the objective's field of view 38 containing the tray T, the well 26, and the slider 10, as illustrated in FIG. 5, several rows of data in the x direction from the left edge 40 of the field of view (as shown by arrows Ax) can be first checked to identify the first pixel in each row having a modulation above a predetermined threshold (for instance, the ratio of Imax−Imin to Imax+Imin to be at least 0.02). Based on the position of these pixels, a line corresponding to the shape of one side in the geometry of the slider 10 is derived by standard curve-fitting methods, thereby identifying the left edge 42 of the slider 10 (shown without regions of interest for clarity). It is noted that two points would be sufficient to identify the position of the edge 42 because of its straight linearity, but it is preferable to perfect the identification by deriving a straight line fitted by conventional regression methods over multiple data points.

Similarly, several columns of data in the y direction from the bottom edge 44 of the field of view (as shown by arrows Ay) can then be checked to identify the first pixel in each column having a modulation above a predetermined threshold. Based on the position of these pixels, another line corresponding to another side of the slider 10, adjacent to the first side, is again derived by standard curve-fitting methods, thereby identifying the bottom edge 46 of the slider 10. As would be clearly understood by one skilled in the art, the identification of the position of the two adjacent edges 42 and 46 also produces the position of the corner 48 between them, as well as the angle of either edge with respect to a predetermined reference baseline, such as the bottom edge 44 of the field of view 38.

Figure 6:
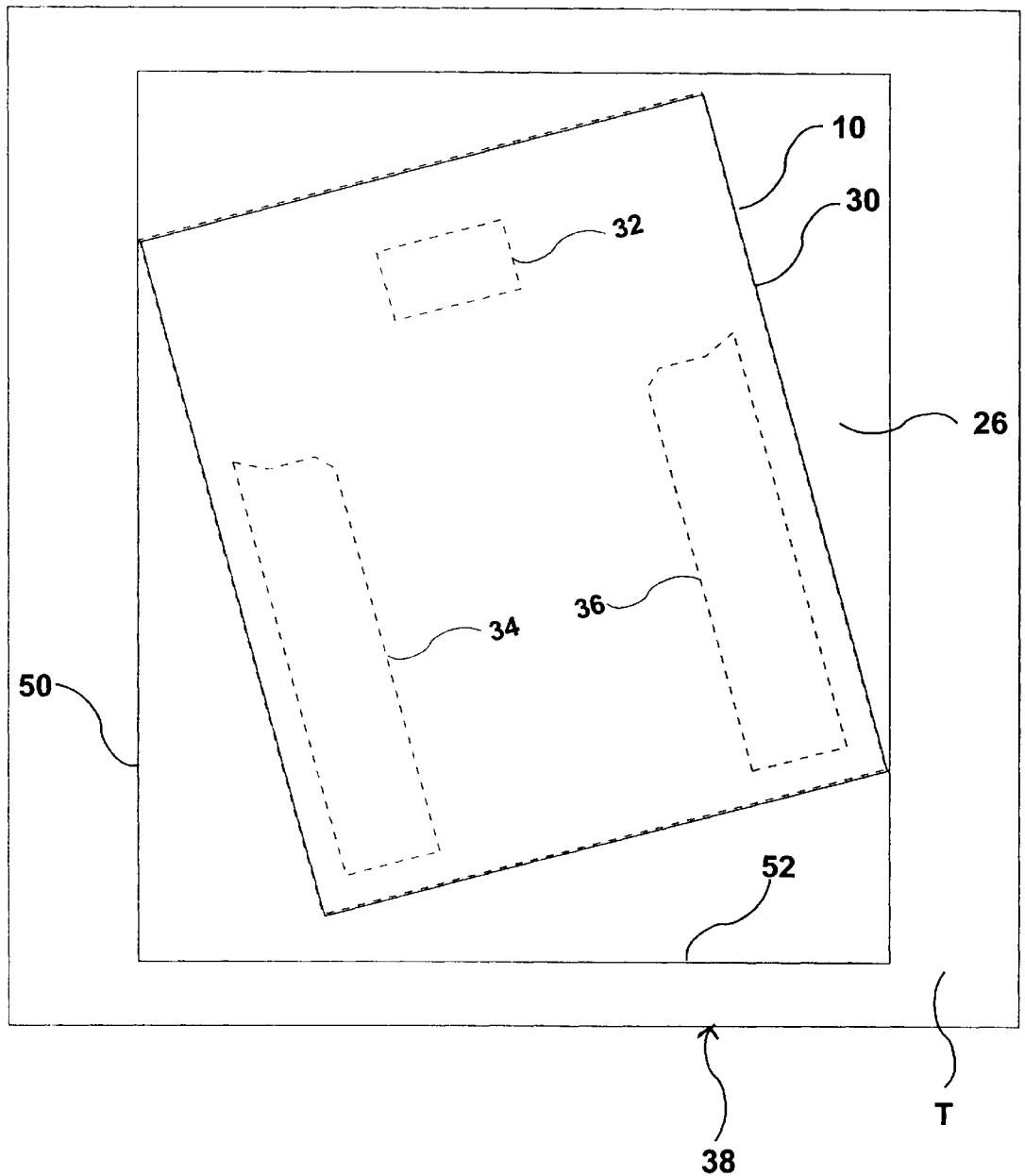
FIG. 6 illustrates a template superimposed on a slider within the field of view of FIG. 5.

Once this information is available, the procedure of the invention consists of shifting the position of the edges 42 and 46 of the slider 10 (and correspondingly all pixels within the filed of view), through conventional coordinate translation techniques, so that the left and bottom edges of the slider overlay the corresponding edges of the template 30. Inasmuch as the template used is designed to match the geometry of the slider 10 within manufacturing tolerances, the entire template 10, including the patterns 32,34,36 intended to represent the regions of interest 12,14,16, will overlay the slider 10 once the left and bottom edges are matched. Analysis of the interferometric data can then proceed by processing only those data that correspond to pixels contained within the regions of interest in the magnetic head 10, as illustrated in FIG. 6, which are automatically and precisely identified by their corresponding patterns or island in the template 30.

Figure 7:
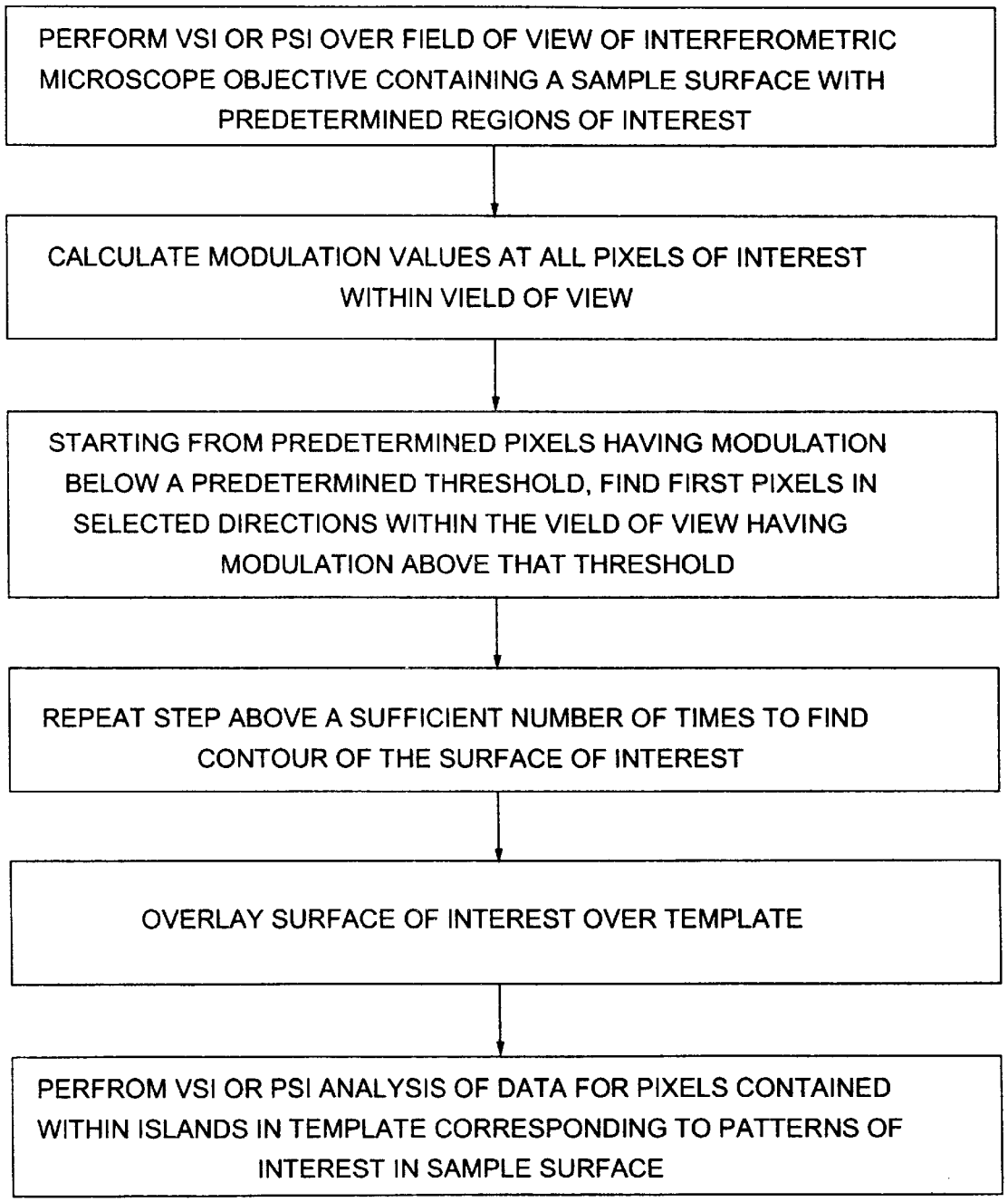
FIG. 7 is a flow chart of the steps of the procedure of the invention.

The steps of the process of the invention are shown in FIG. 7.

It is understood that the invention could be practiced in equivalent fashion by shifting the coordinates of the template to overlay the position of the slider.

In practice, it is preferable to limit the field of view 38 to include the sample 10 and a sufficiently large portion of the tray's well 26 to cover the sample, but not the edges 50,52 (FIG. 6) of the well being scanned for modulation data. This eliminates the possibility of collecting contradictory data from the top surface of the tray (such as could happen if it were within the focal depth of the microscope objective).

Thus, the invention discloses a simple procedure for avoiding the time-consuming and often unreliable process of template alignment used in the prior art. The technique is valid for any situation where the outline of the sample surface of interest can be distinguished from the background of the structure supporting it on the basis of distinct modulation characteristics. Even where the sample surface and the background are both within the focal depth of the microscope objective being used, the procedure can still be applied if the materials or their surface characteristics are such that observably distinct modulations are produced.

The invention has been described for simplicity in terms of a substantially rectangular magnetic-head slider, but the technique could be used in equivalent fashion with any sample geometry suitable for spotting by identifying its contour. Obviously, an appropriate template having the same design geometry of the sample surface must be used. Similarly, a magnetic head with ABS areas as the regions of interest has been illustrated as the test sample for the invention, but a different kind of sample or different regions (such as the shallower intermediate region or the deeper cavity region of the magnetic head) could be identified and tested in equivalent fashion.

Algorithms for identifying the contour of the sample by finding the first line of pixels showing a level of significant modulation proceeding in rows and columns in selected directions are well within the knowledge of those skilled in the art, as are algorithms for fitting appropriate curves through those pixel points and for translating the coordinates of the template to overlay the sample. Therefore, these techniques are not described in detail here. Similarly, appropriate threshold levels for distinguishing between pixels with or without significant modulation depend on the noise of the data collected by the system and are also well within the design criteria of one skilled in the art. We found that setting the threshold at a modulation level equal to the RMS noise level 2% of the system produced clear lines defining the edges of the sample.

After the notion of the invention was first appreciated, experiments were performed trying to utilize the same concept with light intensity data, rather than modulation data. We found that a distinct change in reflected intensity may or may not be observed, depending on the material and surface condition constituting the sample and the supporting background. For example, the edge of a highly reflective metallic sample could be discerned from a dark plastic background using a suitable threshold intensity level, but the procedure could not be applied generally. Therefore, use of modulation as the differentiating factor is greatly preferred.

Figure 8:
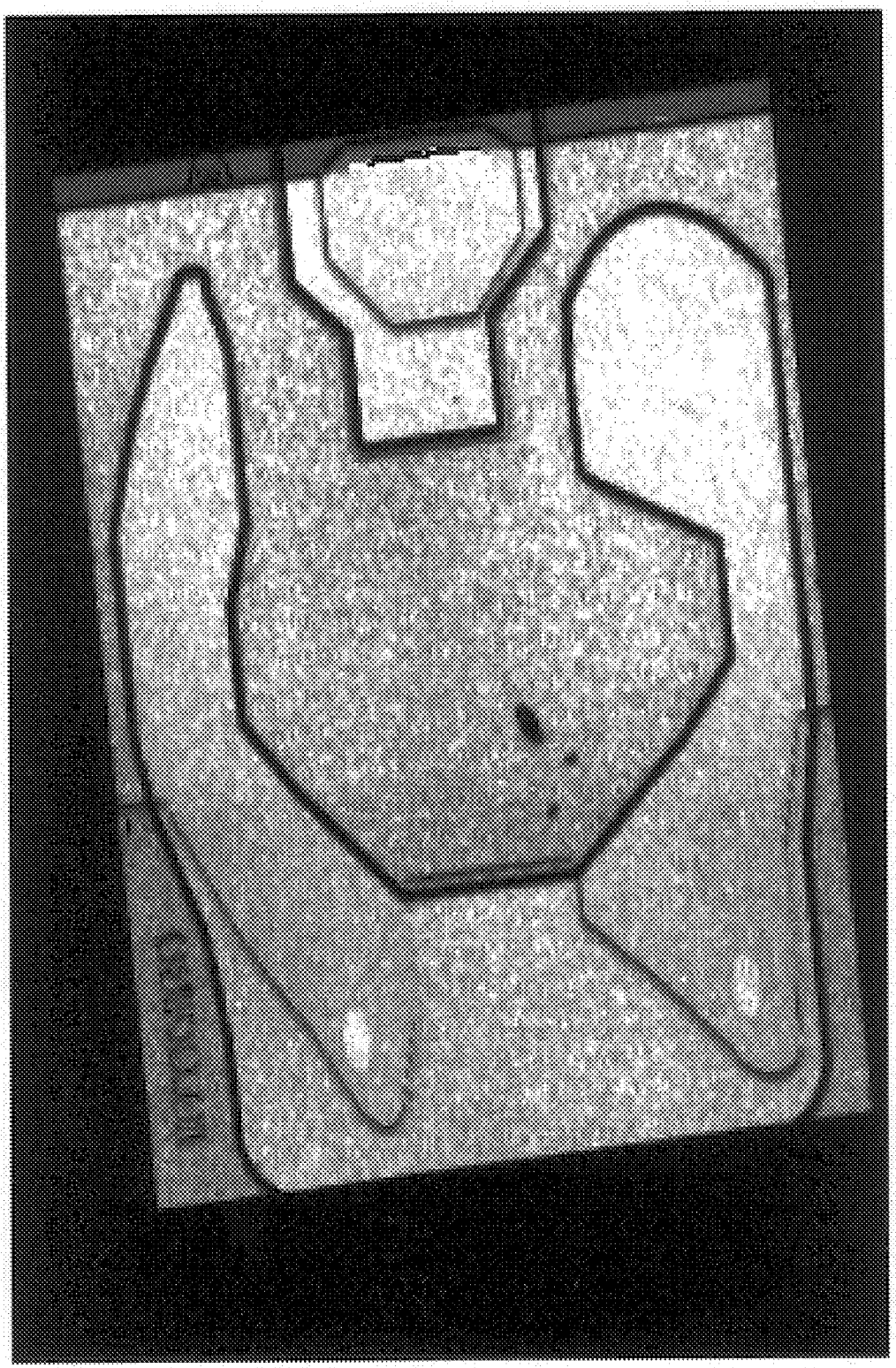
FIG. 8 is a picture of a magnetic-head slider as seen within the field of view of an interferometric microscope objective.
Figure 9:
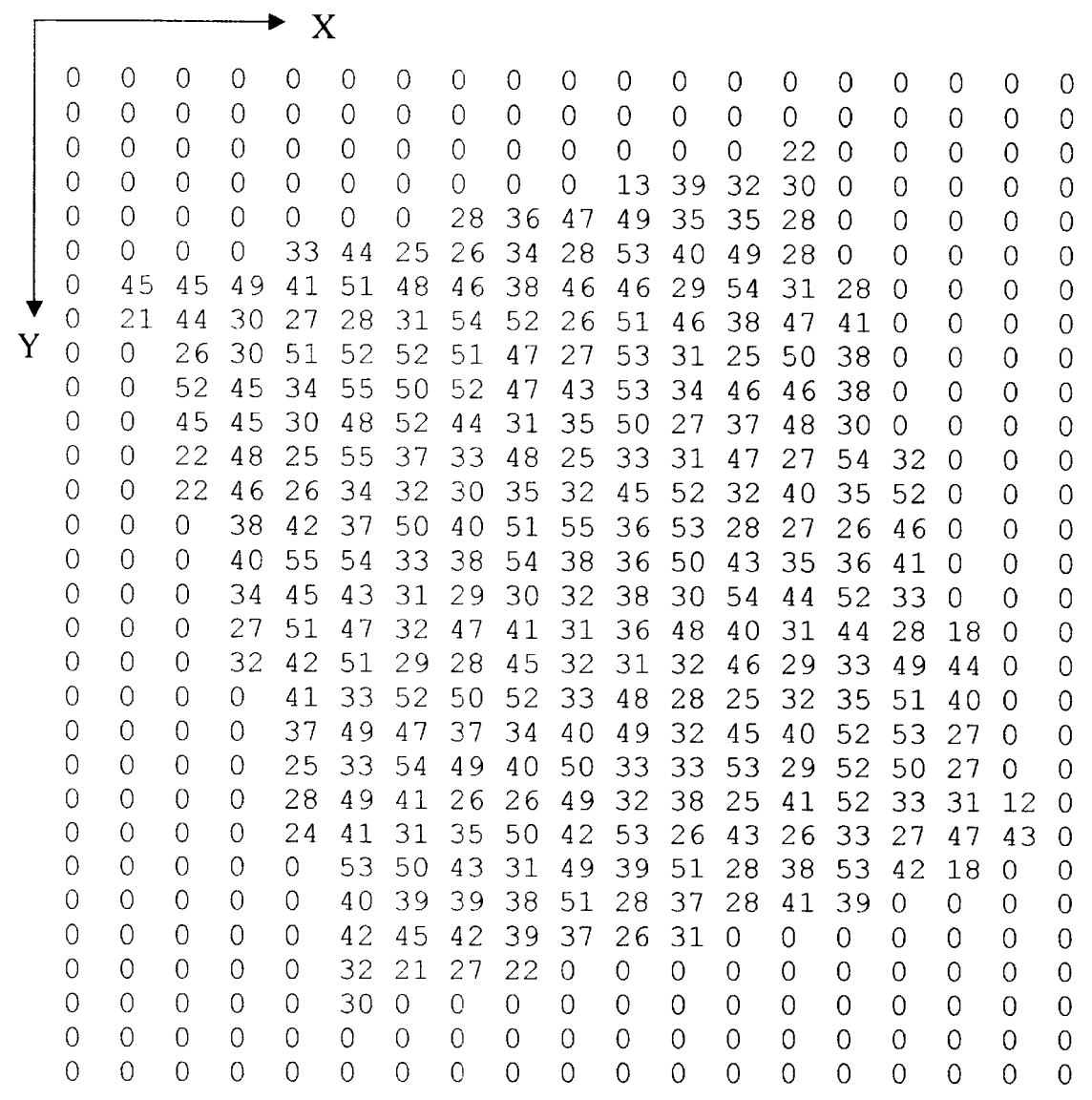

A simplified actual example of the invention is illustrated in FIGS. 8–11. A magnetic-head slider of Durango design with PAL (pad assisted landing) from Seagate Technology of Scotts Valley, Calif., is shown in FIG. 8 as seen within the field of view of a 3.8X Michelson interferometric objective of a Wyko® HD-3300 interferometer. FIG. 9 shows some of the modulation data collected during a PSI scan of the sample for each pixel in a portion of the field of view used to find the outline of the sample. In order to facilitate the illustration, each data point shown as corresponding to one pixel in the figure in fact corresponds to a value representative of a plurality of adjacent pixels in the actual data, which are too numerous for representation in table form. As a result, the spatial resolution of the information illustrated in FIG. 9 is greatly reduced with respect to the actual data. X and y refer to rows and columns, respectively, in the array of pixels corresponding to the portion analyzed.

Figure 10:
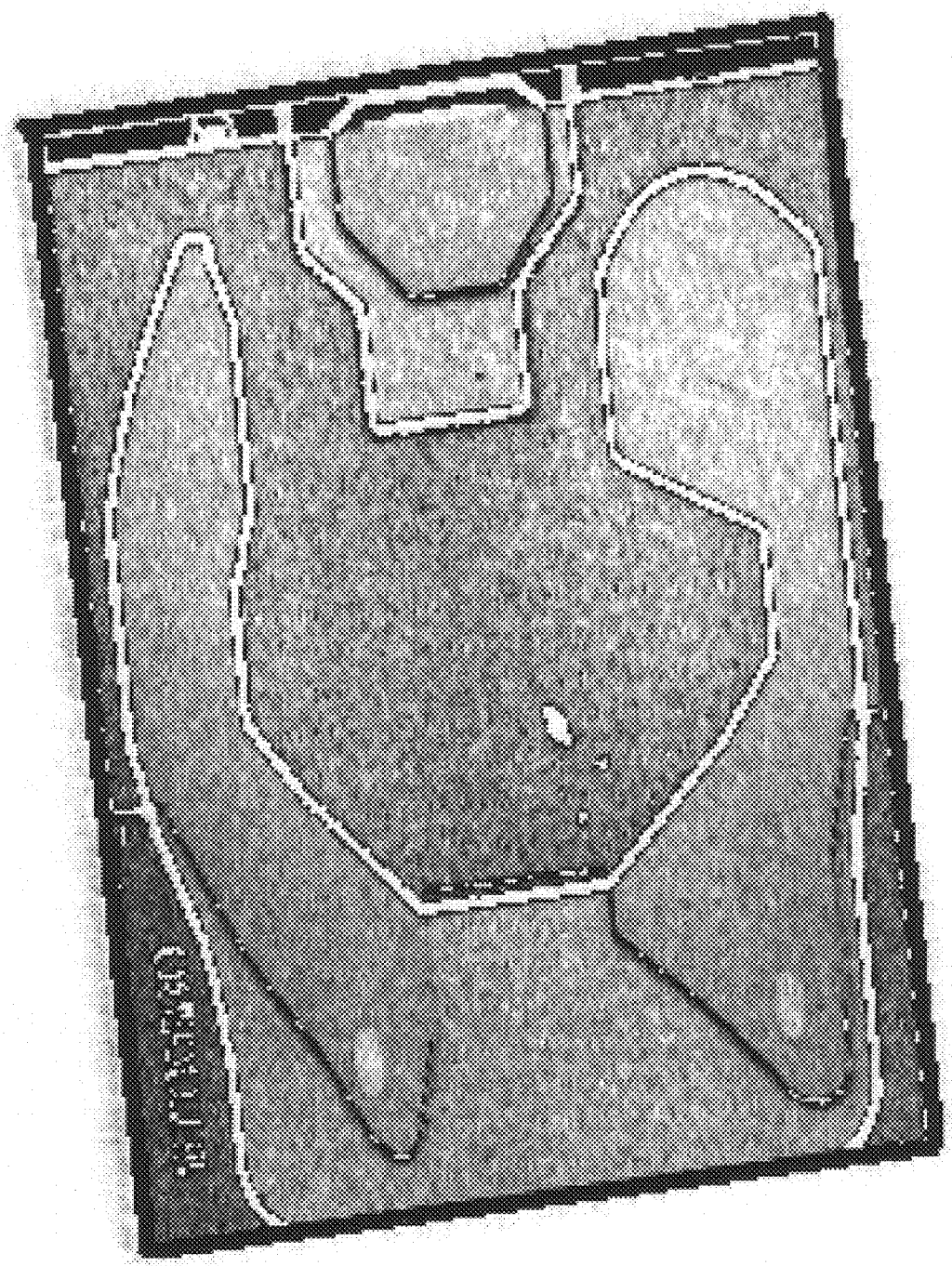
FIG. 10 is an image showing the outline of the slider of FIG. 8 as defined by the border of pixels in FIG. 9 having significant modulation levels.
Figure 11:
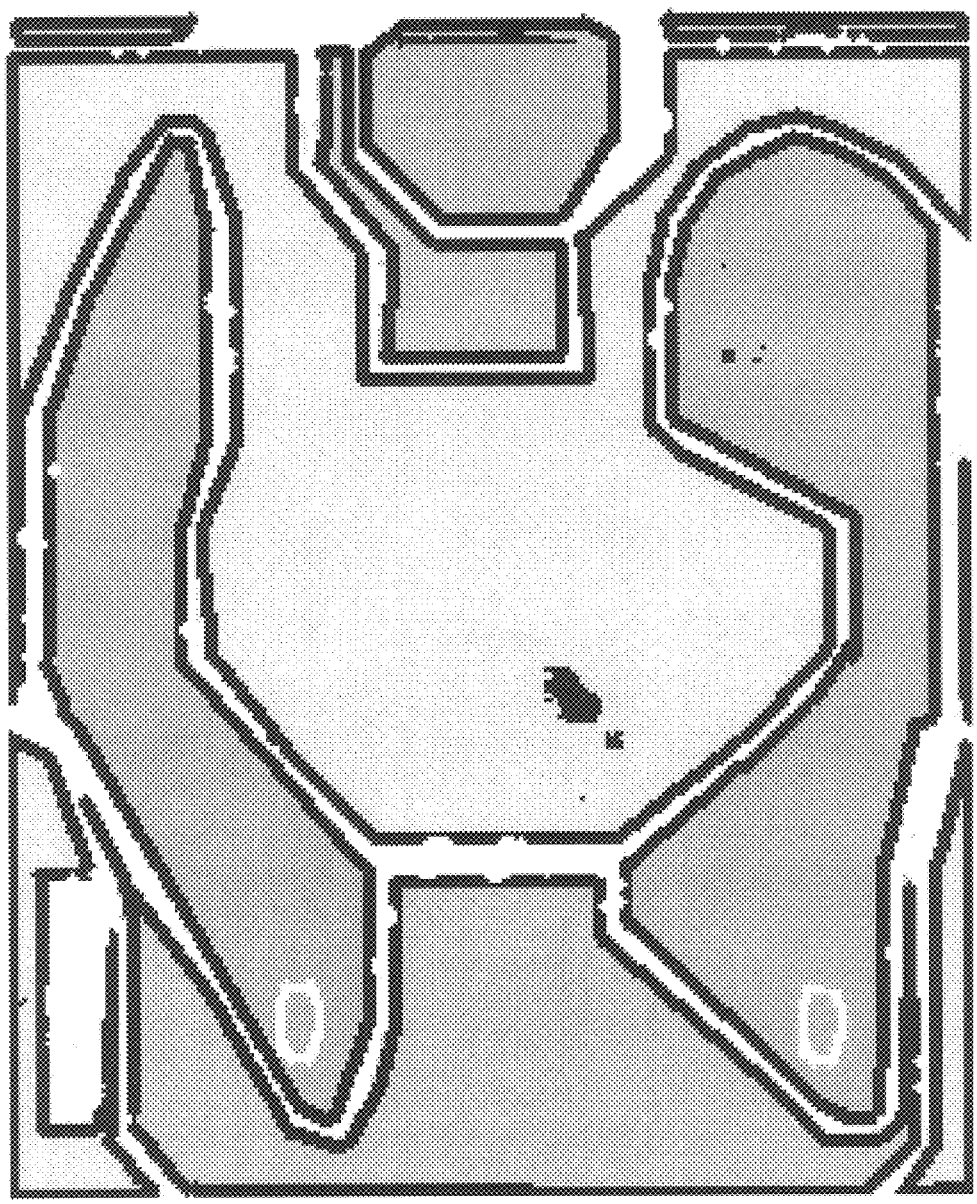
FIG. 11 is the slider of FIG. 8 shown with a template superimposed over its boundary following the identification procedure of the invention.

Based on the data reported above, it is clear that the contour of the slider is defined by the first line of pixels showing a significant value of modulation, as outlined in the corresponding image of FIG. 10. (It is noted that the actual full set of data, rather than only the data of FIG. 9, were fitted with straight lines to identify the edges of the slider, thereby avoiding the problem of poor resolution introduced by the approximation produced by utilizing fewer than all data available from scanning.) Finally, FIG. 11 shows a corresponding template overlaying the slider of interest as it appeared after electronic translation of the identified slider being tested to be aligned with the template within the field of view according to the invention. The example demonstrates the ease and preciseness with which the invention makes it possible to match templates to test samples.

It is understood that many equivalent template systems are possible within the scope of the present invention and that those skilled in the art could easily design a special system for a specific application. Thus, various changes in the details and steps that have been described may be made by those skilled in the art within the principles and scope of the invention herein illustrated and defined in the appended claims. While the invention has been shown and described in what are believed to be the most practical and preferred embodiments, it is recognized that departures can be made therefrom within the scope of the invention, which is therefore not to be limited to the details disclosed herein, but is to be accorded the full scope of the claims so as to embrace any and all equivalent apparatus and methods.

We claim:

1. In a system wherein a template with selected patterns is used for identifying and analyzing by interferometric measurements corresponding regions of interest in a sample surface, and wherein the template has an outline corresponding at least in part to a contour of the sample surface, a method for aligning the selected patterns in the template with the regions of interest in the sample surface comprising the following steps:
   (a) calculating the modulation at each pixel within a field of view containing said regions of interest in the sample surface;
   (b) identifying a contour portion of the sample surface by finding multiple pixels having a modulation at least equal to a predetermined threshold level, each of said pixels being adjacent to a pixel having a modulation below said threshold level, said contour portion being sufficient to characterize a position of the sample surface within the field of view; and
   (c) placing the template within the field of view with said outline overlaying said contour portion of the sample surface.

2. The method described in claim 1, wherein said step (a) is carried out by vertical scanning interferometry.

3. The method described in claim 1, wherein said step (b) is carried out by finding said multiple pixels having a modulation at least equal to a predetermined threshold level in a number sufficient for fitting a curve therethough to model said contour portion of the sample surface.

4. The method described in claim 2, wherein said step (b) is carried out by finding said multiple pixels having a modulation at least equal to a predetermined threshold level in a number sufficient for fitting a curve therethough to model said contour portion of the sample surface.

5. The method described in claim 1, wherein said sample is a magnetic-head slider.

6. The method described in claim 3, wherein said sample is a magnetic-head slider and said number is at least four.

7. The method described in claim 4, wherein said sample is a magnetic-head slider and said number is at least four.

8. The method described in claim 1, wherein said step (a) is carried out by phase shifting interferometry.

9. The method described in claim 8, wherein said step (b) is carried out by finding said multiple pixels having a modulation at least equal to a predetermined threshold level in a number sufficient for fitting a curve therethrough to model said contour portion of the sample surface.

10. The method described in claim 9, wherein said sample is a magnetic-head slider and said number is at least four.

11. In a system wherein a template with selected patterns is used for identifying and analyzing by interferometric measurements corresponding regions of interest in a sample surface contained within a background surface, wherein the template has an outline corresponding at least in part to a contour of the sample surface, a method for aligning the selected patterns in the template with the regions of interest in the sample surface comprising the following steps:
   (a) detecting, at each pixel within a field of view containing the background surface and the sample surface, the intensity of reflected light from the sample surface and from the background surface;
   (b) identifying a contour portion of the sample surface by finding multiple pixels having an intensity at least equal to a predetermined threshold level, each of said pixels being adjacent to a pixel having an intensity below said threshold level, said contour portion being sufficient to characterize a position of the sample surface within the field of view; and
   (c) placing the template within the field of view with said outline overlaying said contour portion of the sample surface.

12. The method described in claim 11, wherein said step (b) is carried out by finding said multiple pixels having an intensity at least equal to a predetermined threshold level in a number sufficient for fitting a curve therethrough to model said contour portion of the sample surface.

13. The method described in claim 11, wherein said sample is a magnetic-head slider.

14. The method described in claim 12, wherein said sample is a magnetic-head slider and said number is at least four.

15. In a system wherein a template with selected patterns is used for identifying and analyzing by interferometric measurements corresponding regions of interest in a sample surface, and wherein the template has an outline corresponding at least in part to a contour of the sample surface, apparatus for aligning the selected patterns in the template with the regions of interest in the sample surface comprising the following components:

means for calculating the modulation at each pixel within a field of view containing said regions of interest in the sample surface;

means for identifying a contour portion of the sample surface by finding multiple pixels having a modulation at least equal to a predetermined threshold level, each of said pixels being adjacent to a pixel having a modulation below said threshold level, said contour portion being sufficient to characterize a position of the sample surface within the field of view; and means for placing the template within the field of view with said outline overlaying said contour portion of the sample surface.

16. The apparatus described in claim 15, wherein said calculating means includes means for carrying out vertical scanning interferometry.

17. The apparatus described in claim 15, wherein said identifying means includes means for finding said multiple pixels having a modulation at least equal to a predetermined threshold level in a number sufficient for fitting a curve therethough to model said contour portion of the sample surface.

18. The apparatus described in claim 16, wherein said identifying means includes means for finding said multiple pixels having a modulation at least equal to a predetermined threshold level in a number sufficient for fitting a curve therethough to model said contour portion of the sample surface.

19. The apparatus described in claim 15, wherein said sample is a magnetic-head slider.

20. The apparatus described in claim 17, wherein said sample is a maqnetic-head slider and said number is at least four.

21. The apparatus described in claim 18, wherein said sample is a magnetic-head slider and said number is at least four.

22. The apparatus described in claim 15, wherein said calculating means includes means for carrying out phase shifting interferometry.

23. The apparatus described in claim 22, wherein said identifying means includes means for finding said multiple pixels having a modulation at least equal to a predetermined threshold level in a number sufficient for fitting a curve therethough to model said contour portion of the sample surface.

24. The apparatus described in claim 23, wherein said sample is a magnetic-head slider and said number is at least four.

* * * * *